United States Patent
Jakimov et al.

(10) Patent No.: US 9,682,397 B2
(45) Date of Patent: Jun. 20, 2017

(54) DEVICE FOR THE GENERATIVE PRODUCTION OF A COMPONENT

(71) Applicant: MTU Aero Engines AG, Munich (DE)

(72) Inventors: Andreas Jakimov, Munich (DE); Steffen Schlothauer, Erdweg (DE); Georg Schlick, Munich (DE)

(73) Assignee: MTU AERO ENGINES AG, Munich (DE)

( * ) Notice: Subject to any disclaimer, the term of this patent is extended or adjusted under 35 U.S.C. 154(b) by 104 days.

(21) Appl. No.: 14/681,757

(22) Filed: Apr. 8, 2015

(65) Prior Publication Data
US 2015/0290671 A1    Oct. 15, 2015

(30) Foreign Application Priority Data

Apr. 11, 2014  (DE) ........................ 10 2014 206 996

(51) Int. Cl.
| | | |
|---|---|---|
| *B29C 67/00* | (2017.01) | |
| *B05C 11/10* | (2006.01) | |
| *B22F 3/105* | (2006.01) | |
| *B05D 1/26* | (2006.01) | |

(52) U.S. Cl.
CPC .......... *B05C 11/1039* (2013.01); *B05D 1/26* (2013.01); *B22F 3/1055* (2013.01); *B29C 67/0077* (2013.01); *B29C 67/0085* (2013.01); *B22F 2003/1056* (2013.01); *B22F 2003/1059* (2013.01); *B29C 67/0096* (2013.01); *Y02P 10/24* (2015.11); *Y02P 10/295* (2015.11)

(58) Field of Classification Search
CPC .................................................. B29D 67/0077
See application file for complete search history.

(56) References Cited

U.S. PATENT DOCUMENTS

| | | | |
|---|---|---|---|
| 2004/0084814 A1* | 5/2004 | Boyd ................. | B29C 67/0081 264/497 |
| 2005/0074550 A1* | 4/2005 | Leuterer ............ | B29C 67/0077 427/180 |
| 2009/0169664 A1 | 7/2009 | Cox | |
| 2015/0071809 A1* | 3/2015 | Nordkvist ............ | B22F 1/0014 419/23 |

FOREIGN PATENT DOCUMENTS

| | | |
|---|---|---|
| DE | 102010020416 A1 | 11/2011 |
| DE | 102011088158 A1 | 6/2013 |
| DE | 102011121568 A1 | 6/2013 |
| EP | 1600282 A1 | 11/2005 |

* cited by examiner

*Primary Examiner* — Ryan Ochylski
(74) *Attorney, Agent, or Firm* — Barlow, Josephs & Holmes, Ltd.

(57) ABSTRACT

The invention relates to a device (10) and method for the generative production of a component (12). The device comprises two supply tanks (14a, 14b) for taking up powder-form material (16), two overflow tanks (22a, 22b) for taking up excess powder-form material (16), wherein a closing means (24a, 24b) is assigned to each overflow tank (22a, 22b), this means being switchable between a closed position, in which powder-form material (16) cannot be transported into the respective overflow tank (22a, 22b), and an open position, in which powder-form material (16) can be transported into the respective overflow tank (22a, 22b).

10 Claims, 1 Drawing Sheet

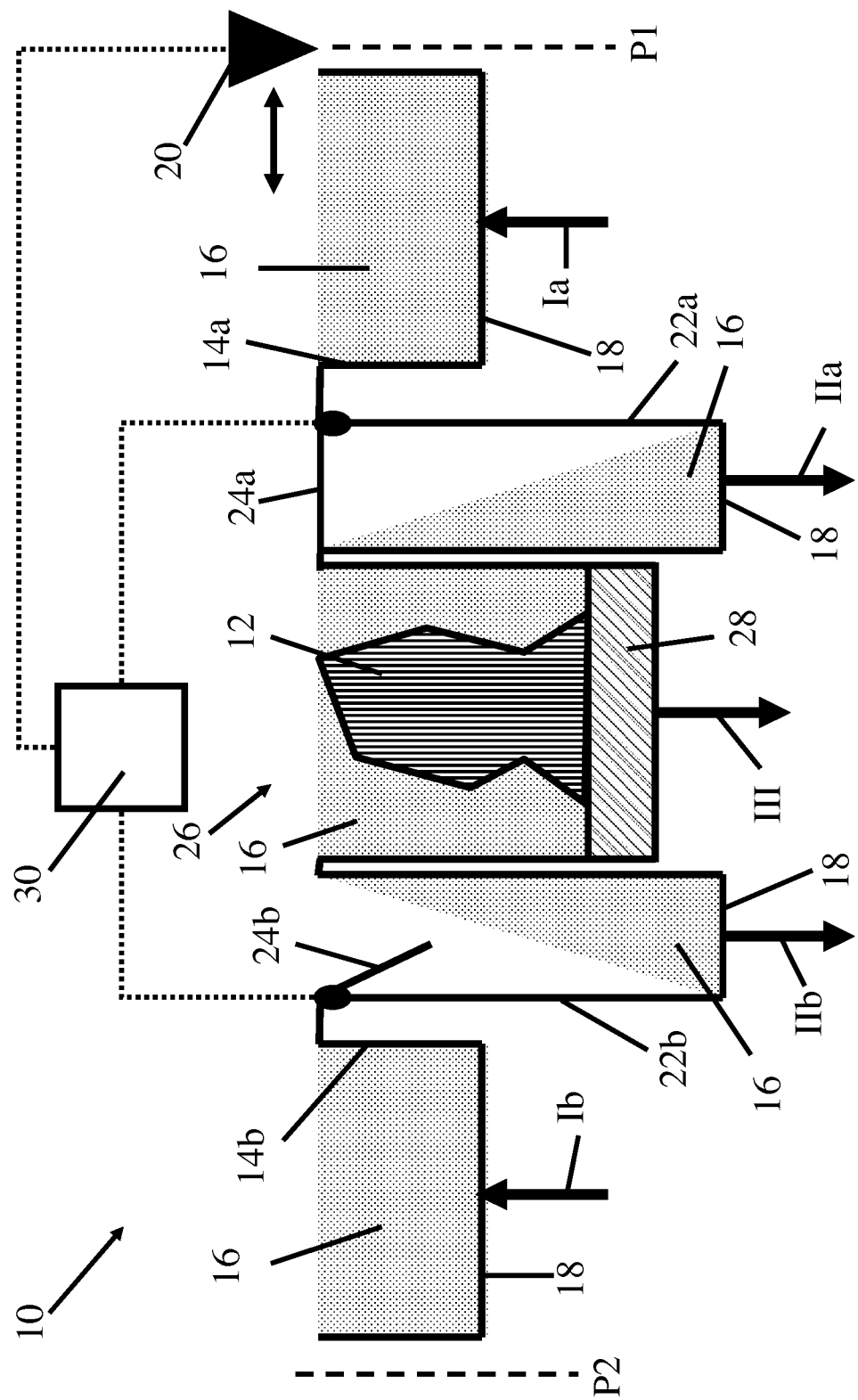

DEVICE FOR THE GENERATIVE PRODUCTION OF A COMPONENT

BACKGROUND OF THE INVENTION

The invention relates to a device for the generative production of a component. In addition, the invention relates to a method for operating such a device.

In conventional devices for the generative production of components, for example, in selective laser sintering units, one or more components are produced layerwise from a powder-form material in a structural space or working chamber of the device. For this purpose, a component platform that can be lowered layerwise is coated with powder-form material or material mixture by transporting the material via a linearly movable transport means from a supply tank serving as a powder storage tank to the working chamber. Excess powder falls into overflow containers disposed laterally to the working chamber and can be recovered therefrom. Subsequently, the material is melted on and/or sintered locally in accordance with layer information for the component to be produced. After this, the component platform is lowered by a pre-defined layer thickness and the process is repeated until the component construction is finished. Such a device is already known, for example, from DE 10 2011 088 158 A1.

Viewed as a disadvantage of the known devices is the circumstance that the coating process takes a relatively long time in comparison to melting or sintering, whereby the entire production process of the component is greatly prolonged, and thus the productivity and economic efficiency of the device are reduced.

SUMMARY OF THE INVENTION

An object of the present invention is to create a device of the type named initially, which makes possible an accelerated generative production of components. Another object of the invention is to indicate a corresponding method for operating such a device.

The objects are achieved according to a device and method with the features of the present invention for the generative production of a component and for operating such a device. Advantageous embodiments with appropriate enhancements of the invention are indicated in the respective dependent claims, wherein advantageous embodiments of the device can be viewed as advantageous embodiments of the method, and vice versa.

A first aspect of the invention relates to a device for the generative production of a component. In order to make possible an accelerated generative production of components, according to the invention, an additional supply tank is provided for the uptake of powder-form material. In addition, it is provided that the transport means of the device can be moved from the supply tank over the first overflow tank to the working chamber and from the working chamber over the second overflow tank to the additional supply tank, as well as from the additional supply tank over the second overflow tank to the working chamber and from the working chamber over the first overflow tank to the supply tank. In this way, it is assured according to the invention, that the transport means serving as the coating means does not need to backtrack over an unproductive idle path, unlike the prior art. Instead, the powder-form material or the powder-form material mixture can be transported either in a direction from the supply tank to the working chamber or in the reverse direction from the additional supply tank to the working chamber. Therefore, the transport means does not need to travel the complete path back to the initial position in order to prepare a new powder layer for the production of another component layer. This shortens the coating processes correspondingly by approximately 50%, so that the productivity and economic efficiency of the device can be increased by up to 50% or more.

In an advantageous embodiment of the invention, it is provided that the first closing means and/or the second closing means is formed as a flap, which can be moved between the closed position and the open position. Although the first and/or second closing means is basically not limited to a specific embodiment and, for example, can also be formed as a valve or the like, the configuration as a flap offers the advantage that the construction of the closing means in question can be executed in a particularly simple, robust, and cost-effective way. In addition, overflow tanks with openings having large surface area can also be closed or opened alternatively by means of a movable flap. Basically, of course, several flaps or one segmented flap can also be provided here.

Additional advantages result if the first closing means is formed as a flap that is articulated in the region of an upper edge of the first overflow tank facing the supply tank and can be pivoted between the closed position and the open position. Alternatively or additionally, it is provided that the second closing means is formed as a flap that is articulated in the region of an upper edge of the second overflow tank facing the additional supply tank, and can be pivoted between the closed position and the open position. This makes it possible to collect excess powder particularly reliably in the respective overflow tank, as a function of the direction of movement of the transport means, since the flap can be used in the open position as a type of filling slide for the powder.

In another advantageous embodiment of the invention, it is provided that the transport means, the first closing means, and the second closing means are coupled to a control means, whereby the control means is designed to switch the first closing means into the closed position and the second closing means into the open position, when the transport means is moved from the supply tank over the first overflow tank to the working chamber and from the working chamber over the second overflow tank to the additional supply tank. In addition, the control means is designed to switch the first closing means into the open position and the second closing means into the closed position, when the transport means is moved from the additional supply tank over the second overflow tank to the working chamber and from the working chamber over the first overflow tank to the supply tank. In other words, depending on the direction of movement of the transport means, the overflow tank that follows the respective supply tank is closed by the corresponding activation and/or regulation of the closing means assigned thereto, whereas the other overflow tank is opened by corresponding activation and/or regulation of the closing means assigned thereto. It is advantageously assured in this way that the powder material transported to the working chamber from the respective supply tank does not fall in an undesired manner into the overflow tank mounted in front of the working chamber, but only falls into the overflow tank mounted downstream to the working chamber in the direction of movement of the transport means. This makes possible a particularly efficient utilization of the powder material as well as an additional acceleration of the coating process.

Further advantages result if the supply tank and/or the additional supply tank and/or the first overflow tank and/or the second overflow tank comprise(s) a movable bottom plate. In the case of the supply tank, a defined quantity of powder material can be prepared for another coating process in this way, by a defined lifting of the bottom plate. Alternatively or additionally, in the case of the overflow tank, an enlarged uptake space for excess powder material can be created by lowering the bottom plate.

In addition, it has been shown to be advantageous if the working chamber comprises a movable platform, which can be lowered, for the production of the component. A layer-wise production of the component is simplified if the platform can be lowered by a defined amount after each coating and melting or sintering pass, and coating can be carried out with new powder material.

In another advantageous embodiment of the invention, it is provided that the first overflow tank and/or the second overflow tank is (are) coupled to a feedback means, by means of which material can be returned to the supply tank and/or to the additional supply tank. In this way, the component can be produced with a particularly small excess of material, since excess material can be transported back to the respective supply tank and can be used for another method pass. In this case, it can also be provided that a common receptacle for material is assigned to the two overflow tanks, and the two supply tanks are provided with material from this receptacle.

By configuring the device as a selective laser melting unit, a free-form manufacture of the most varied components is made possible. For example, components with very intricate structure such as hollow structural components of a turbine or a compressor can be produced. In addition, components can be produced that are no longer producible by casting technology, such as, for example, structural components of engines with grid structures for increasing structural strength in the case of low weight and for the clear increase of inner surfaces for improvement of cooling efficiency. It is also possible to incorporate boreholes for discharging cooling air from the engine component directly into the structure by means of the generative construction method. By heating the working chamber up to a temperature just below the melting point of the material used, the crystal structure of the forming component can also be influenced and controlled. The powder-form material can thus be composed of metal, a metal alloy, ceramics, silicate, or a mixture thereof. In particular, the device may have at least one $CO_2$ or Nd:YAG laser.

A second aspect of the invention relates to a method for operating a device according to the first aspect of the invention. Therefore, it is provided according to the invention that the transport means of the device is moved either from the supply tank over the first overflow tank to the working chamber and from the working chamber over the second overflow tank to the additional supply tank, or from the additional supply tank over the second overflow tank to the working chamber and from the working chamber over the first overflow tank to the supply tank, in order to transport powder-form material between the supply tank and the additional supply tank. In this way, it is assured according to the invention that the transport means serving as the coating means does not need to backtrack over an unproductive idle path, unlike the prior art. Instead, the powder-form material or the powder-form material mixture is transported either in a direction from the supply tank to the working chamber or in the reverse direction from the additional supply tank to the working chamber, whereby excess material can be collected in the respective overflow tanks. Based on this alternating movement between the two supply tanks, the transport means need not travel the complete path back to the initial position, as was the case previously, in order to prepare a new powder layer for the production of another component layer, but can transport powder material to the working chamber in every movement between a first position assigned to the supply tank and a second position assigned to the additional supply tank. This shortens the coating processes correspondingly by approximately 50%, so that the productivity and economic efficiency of the device can be increased by up to 50% or more.

In an advantageous configuration of the invention, the transport means, the first closing means, and the second closing means are coupled to a control means, whereby the control means switches the first closing means to the closed position and the second closing means to the open position, when the transport means is moved from the supply tank over the first overflow tank to the working chamber and from the working chamber over the second overflow tank to the additional supply tank. Alternatively, the control means switches the first closing means to the open position and the second closing means to the closed position, when the transport means is moved from the additional supply tank over the second overflow tank to the working chamber and from the working chamber over the first overflow tank to the supply tank. In other words, preferably at the beginning of each travel path of the transport means, the overflow tank disposed in front of the working chamber in the direction of movement is closed, whereas the overflow tank connected downstream to the working chamber is opened, in order to take up excess material before it is transported to the opposite-lying supply tank.

BRIEF DESCRIPTION OF THE DRAWING FIGURE

Further features of the invention result from the claims, the exemplary embodiment as well as on the basis of the drawing. The features and combinations of features named above in the description, as well as the features and combinations of features named in the example of embodiment below can be used not only in the combination indicated in each case, but also in other combinations, without departing from the scope of the invention.

FIG. 1 shows a schematic sectional view of a device according to the invention for the generative production of a component.

DETAILED DESCRIPTION OF THE INVENTION

FIG. 1 shows in schematic sectional view an example of embodiment of a device 10 according to the invention for the generative production of a component 12. The device 10, which in the present case is formed as a selective laser melting unit, comprises for this purpose a supply tank 14*a* as well as an additional supply tank 14*b* for taking up powder-form material 16. Each of the supply tanks 14*a*, 14*b* in the example of embodiment shown comprises a bottom plate 18 that can be moved according to the arrows Ia or Ib, by means of which, the quantity of material 16 that can be transported between the two limiting positions P1 and P2 by a transport means 20 of the device 10 is adjustable. In addition, the device 10 comprises a first overflow tank 22*a* as well as a second overflow tank 22*b*, each of which serves for taking up excess powder-form material 16. Therefore, a closing means 24a or 24b, which is formed in the present case as a flap, is assigned to each overflow tank 22a, 22b. It is recognized that the closing means 24a is articulated at a side of the overflow tank 22a facing the supply tank 14a, whereas the closing means 24b is articulated at a side of the overflow tank 22b facing the additional supply tank 14b. In the present case, the closing means 24a is shown in a closed position, in which powder-form material 16 cannot be transported into the first overflow tank 22a by the transport means 20. In contrast to this, the closing means 24b is shown in an open position, in which powder-form material 16 can be transported into the second overflow tank 22b. It is recognized that the closing means 24b thus forms a type of filling slide, by means of which the material 16 can be guided into the overflow tank 22b. Each of the overflow tanks 22a, 22b also comprises a movable bottom plate 18, which can be lowered according to arrows IIa or IIb, in order to create a larger uptake space for excess material 16, and to prevent material 16 from accumulating above the respective overflow tank 22a, 22b. The transport means 20, the first closing means 24a, and the second closing means 24b are coupled to a control means 30, which controls or regulates the movements of the named means 20, 24a, 24b.

A working chamber 26, in which the component 12 can be produced layerwise in a way known in and of itself from the powder-form material 16, is found between the overflow tanks 22a, 22b. The working chamber 26 has a movable platform 28, which is lowered by a defined amount according to arrow III prior to the production of each component layer, and is coated with new powder material 16 in the way described below.

When the transport means 20 serving as the coating means is to move the powder material 16 from the supply tank 14a to the working chamber 26's construction plane, first the flap 24a is closed by means of the control means 30, while the flap 24b is opened. The transport means 20 is then moved from the position P1 to the position P2, whereby the powder material 16 is moved over the closed overflow tank 22a into the working chamber 26. Excess powder material 16 is then transported further in the direction to the additional supply tank 14b and falls into the open overflow tank 22b. The transport means 20 is then moved further until it reaches the position P2, in this case without transporting material 16. After producing the respective component layer, the transport means 20 is then moved from the position P2 back to the position P1. For this purpose, the flap 24b is closed, while the flap 24b is opened. The transport means 20 thus moves the material 16 from the supply tank 14b over the closed overflow tank 22b into the working chamber 26. Excess material 16 is then further transported to the open overflow tank 22a and falls into it, so that the transport means 20 travels the last part of its path back to the position P1 without material 16. In this way, the coating means 20 only needs to travel once over the complete path, in order to introduce a new layer of material for the production of the respective component layer of the component 12. The duration of the coating process is thus shortened by more than half. The melting or sintering of the material 16 can basically be initiated as early as when the transport means 20 is found outside the working chamber 26 and has still not reached its final position P1 or P2.

What is claimed is:

1. A device (10) for the generative production of a component (12), comprising:
    a first supply tank (14a) for the uptake of powder-form material (16);
    a first overflow tank (22a) for the uptake of excess powder-form material (16), wherein a first closing device (24a) is assigned to the first overflow tank (22a), the first closing device being switchable between a closed position, in which powder-form material (16) cannot be transported into the first overflow tank (22a), and an open position, in which powder-form material (16) can be transported into the first overflow tank (22a);
    a working chamber (26), in which the component (12) is producible layerwise from the powder-form material (16);
    the first overflow tank (22a) located between the first supply tank (14a) and the working chamber (26);
    a second overflow tank (22b) for the uptake of excess powder-form material (16), wherein a second closing device (24b) is assigned to the second overflow tank (22b), the second closing device being switchable between a closed position, in which powder-form material (16) cannot be transported into the second overflow tank (22b), and an open position, in which powder-form material (16) can be transported into the second overflow tank (22b);
    a second supply tank (14b) for uptake of powder-form material (16);
    the second overflow tank (22b) located between the second supply tank (14b) and the working chamber (26); and
    a transport device (20) by which the powder-form material (16) is transported at least from the first supply tank (14a) over the first overflow tank (22a) to the working chamber (26) and from the working chamber (26) to the second overflow tank (22b) and by which the powder-form material (16) is transported at least from the second supply tank (14b) over the second overflow tank (22b) to the working chamber (26) and from the working chamber (26) to the first overflow tank (22a);
    wherein the transport device (20):
        is movable from the first supply tank (14a) over the first overflow tank (22a) to the working chamber (26) and from the working chamber (26) over the second overflow tank (22b) to the second supply tank (14b); and
        is movable from the second supply tank (14b) over the second overflow tank (22b) to the working chamber (26) and from the working chamber (26) over the first overflow tank (22a) to the first supply tank (14a).

2. The device (10) according to claim 1, wherein the first closing device (24a) and/or the second closing device (24b) are formed as a flap, which are movable between the closed position and the open position.

3. The device (10) according to claim 2, wherein the first closing device (24a) is a flap, which is articulated in the region of an upper edge of the first overflow tank (22a) facing the first supply tank (14a) and can be pivoted between the closed position and the open position, and/or in that the second closing device (24b) is a flap, which is articulated in the region of an upper edge of the second overflow tank (22b) facing the second supply tank (14b) and can be pivoted between the closed position and the open position.

4. The device (10) according to claim 1, wherein the transport device (20), the first closing device (24a), and the second closing device (24b) are coupled to a control device (30), wherein the control device (30) is configured:
    to switch the first closing device (24a) into the closed position and the second closing device (24b) into the open position, when the transport device (20) is moved from the first supply tank (14*a*) over the first overflow tank (22*a*) to the working chamber (26) and from the working chamber (26) over the second overflow tank (22*b*) to the second supply tank (14*b*); and to switch the first closing device (24*a*) into the open position and the second closing device (24*b*) into the closed position, when the transport device (20) is moved from the second supply tank (14*b*) over the second overflow tank (22*b*) to the working chamber (26) and from the working chamber (26) over the first overflow tank (22*a*) to the first supply tank (14*a*).

5. The device (10) according to claim 1, wherein the first supply tank (14*a*) and/or the second supply tank (14*b*) and/or the first overflow tank (22*a*) and/or the second overflow tank (22*b*) comprise(s) a movable bottom plate (18).

6. The device (10) according to claim 1, wherein the working chamber (26) comprises a movable platform (28), which can be lowered for the production of the component (12).

7. The device (10) according to claim 1, wherein the first overflow tank (22*a*) and/or the second overflow tank (22*b*) are coupled to a feedback device, by which material (16) can be returned to the first supply tank (14*a*) and/or to the second supply tank (14*b*).

8. The device (10) according to claim 1, wherein the device is configured as a selective laser melting unit.

9. A method for operating a device (10) comprising the steps of:
   providing a first supply tank (14*a*) for the uptake of powder-form material (16);
   providing a first overflow tank (22*a*) for the uptake of excess powder-form material (16), wherein a first closing device (24*a*) is assigned to the first overflow tank (22*a*), the first closing device being switchable between a closed position, in which powder-form material (16) cannot be transported into the first overflow tank (22*a*), and an open position, in which powder-form material (16) can be transported into the first overflow tank (22*a*);
   providing a working chamber (26), in which the component (12) is producible layerwise from the powder-form material (16);
   wherein the first overflow tank (22*a*) located between the first supply tank (14*a*) and the working chamber (26);
   providing a second overflow tank (22*b*) for the uptake of excess powder-form material (16), wherein a second closing device (24*b*) is assigned to the second overflow tank (22*b*), the second closing device being switchable between a closed position, in which powder-form material (16) cannot be transported into the second overflow tank (22*b*), and an open position, in which powder-form material (16) can be transported into the second overflow tank (22*b*);
   providing a second supply tank (14*b*) for the uptake of powder-form material (16);
   wherein the second overflow tank (22*b*) located between the second supply tank (14*b*) and the working chamber (26); and
   providing a transport device (20) by which the powder-form material (16) is transported at least from the first supply tank (14*a*) over the first overflow tank (22*a*) to the working chamber (26) and from the working chamber (26) to the second overflow tank (22*b*) and by which the powder-form material (16) is transported at least from the second supply tank (14*b*) over the second overflow tank (22*b*) to the working chamber (26) and from the working chamber (26) to the first overflow tank (22*a*);
   wherein the transport device (20):
      is moved from the first supply tank (14*a*) over the first overflow tank (22*a*) to the working chamber (26) and from the working chamber (26) over the second overflow tank (22*b*) to the second supply tank (14*b*); and
      is moved from the second supply tank (14*b*) over the second overflow tank (22*b*) to the working chamber (26) and from the working chamber (26) over the first overflow tank (22*a*) to the first supply tank (14*a*);
   wherein the transport device (20):
      is moved either from the first supply tank (14*a*) over the first overflow tank (22*a*) to the working chamber (26) and from the working chamber (26) over the second overflow tank (22*b*) to the second supply tank (14*b*); or
      is moved from the second supply tank (14*b*) over the second overflow tank (22*b*) to the working chamber (26) and from the working chamber (26) over the first overflow tank (22*a*) to the first supply tank (14*a*),
   in order to transport powder-form material (16) between the first supply tank (14*a*) and the second supply tank (14*b*).

10. The method according to claim 9, wherein the transport device (20), the first closing device (24*a*), and the second closing device (24*b*) are coupled to a control device (30), wherein the control device (30):
   switches the first closing device (24*a*) into the closed position and the second closing device (24*b*) into the open position, when the transport device (20) is moved from the first supply tank (14*a*) over the first overflow tank (22*a*) to the working chamber (26) and from the working chamber (26) over the second overflow tank (22*b*) to the second supply tank (14*b*); or
   switches the first closing device (24*a*) into the open position and the second closing device (24*b*) into the closed position, when the transport device (20) is moved from the second supply tank (14*b*) over the second overflow tank (22*b*) to the working chamber (26) and from the working chamber (26) over the first overflow tank (22*a*) to the first supply tank (14*a*).

* * * * *